UNITED STATES PATENT OFFICE.

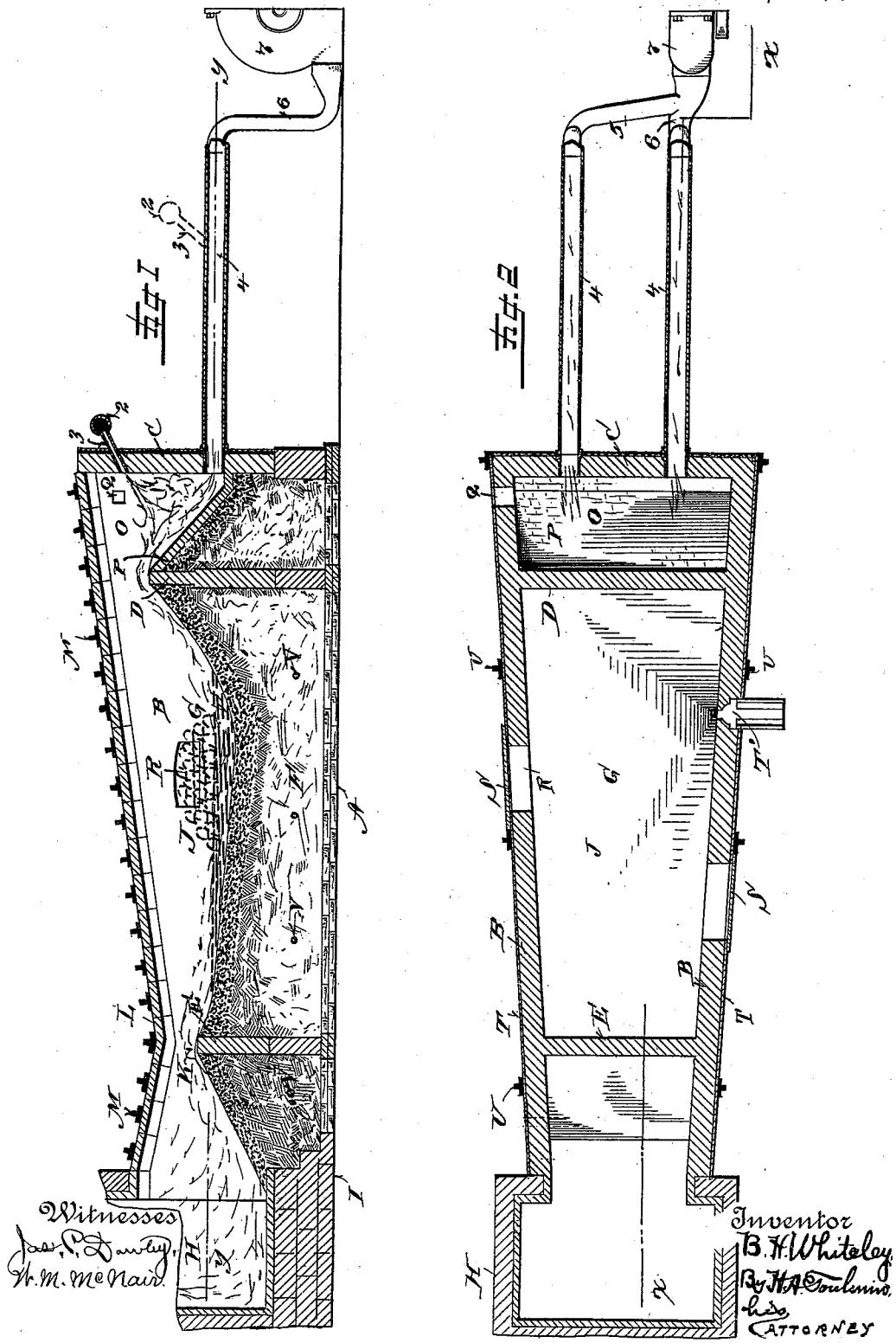

BURT H. WHITELEY, OF MUNCIE, INDIANA, ASSIGNOR TO THE WHITELEY MALLEABLE CASTINGS COMPANY, OF SAME PLACE.

APPARATUS FOR MELTING IRON.

SPECIFICATION forming part of Letters Patent No. 554,559, dated February 11, 1896.

Application filed March 20, 1895. Serial No. 542,465. (No model.)

*To all whom it may concern:*

Be it known that I, BURT H. WHITELEY, a citizen of the United States, residing at Muncie, in the county of Delaware and State of Indiana, have invented certain new and useful Improvements in Apparatus for Melting Iron, of which the following is a specification, reference being had therein to the accompanying drawings.

This invention relates to certain new and useful improvements in an apparatus for melting iron by means of a fuel composed of natural gas mixed with a cold atmospheric blast.

In the application filed by me of even date herewith, Serial No. 542,464, I have set forth, shown, and described a melting apparatus or furnace which is the same as the one embraced herein so far as concerns the furnace proper; but my other said application embraces an apparatus for the utilization of a hot atmospheric blast, which features do not enter herein. This my present apparatus is, however, also designed to melt iron stock from which either gray iron castings are to be made or castings which are afterward to be malleableized.

In the accompanying drawings, on which like reference letters and numerals indicate corresponding parts, Figure 1 is a vertical sectional view of my improved apparatus, taken on the line $x$ $x$ of Fig. 2; and Fig. 2, a horizontal sectional view taken on the line $y$ $y$ of Fig. 1.

The furnace proper is of the same type and construction as that set forth in my said other application and need not therefore be described in further detail than to say that it consists of a bottom A, preferably of stone flags, with side walls, B, and end walls, C, and cross-walls D and E, with a clay filling F and a bed of fire-sand G. It also has a chimney or smoke-stack H built at the rear end upon a heavier foundation I and connecting with the melting-chamber J through a throat K between the cross-wall E and the top L, constructed of cross-sections of fire-bricks supported by arch-bars M. An ignition-chamber O is formed between the end wall, C, and the cross-wall D and the top, a fire-brick bottom P being provided for the ignition-chamber O. An inspection-hole Q and an inspection and skimming aperture R are also provided. The latter openings are closed by suitable doors S, and a tap-hole T' permits the drawing off of molten metal. The apparatus is incased in metallic plates T and is held embraced by stout bars U and cross-rods or bolts V.

A natural-gas supply-pipe 2 carries burners 3, which project through the walls C and discharge into the ignition-chamber O. Cold-air blast-pipes 4 also discharge into said ignition-chamber and connect by branch pipes 5 and 6 with a fan or blast apparatus 7.

In operating this cold-blast furnace the iron is placed in the melting-chamber J and the natural gas and air are injected into the ignition-chamber O, where they thoroughly intermix, the air being deflected by the bottom P. They are also here ignited, and, passing over the cross-wall D, which forms a bridge-wall with the floor P, the flames and products of combustion hug along the bottom G by the action of the natural draft drawing through the throat K in a lower plane than the bridge-wall.

This apparatus has been constructed and put into practical operation on a large and commercial scale in the malleable-iron plant of my assignee, the Whiteley Malleable Castings Company, located at Muncie, Indiana, and satisfactory results obtained. The hot-blast apparatus set forth in my other said application, however, is more satisfactory and effective than this apparatus; yet the latter is well adapted to less rapid production.

If desired, the gas-burners may enter the air-pipes, as shown by the dotted lines in Fig. 1, instead of entering directly into the ignition-chamber.

Having thus fully described my invention, what I claim as new, and desire to secure by Letters Patent, is—

In an iron-melting apparatus, the combination with an inclined bridge-wall, an ignition-chamber formed between it and the end wall of the structure, a melting-chamber beyond and below said bridge-wall and the first-named chamber, and a stack leading from the melting-chamber through a throat, the throat being in a lower plane than the said bridge-wall, of gas-pipes discharging into the upper part of the ignition-chamber and downward and toward the bridge-wall, and cold-air pipes entering into the ignition-chamber near the base, and against the floor of the bridge-wall, whereby said air and said gas thoroughly intermix in the admission-chamber, and are drawn downward and onward from the elevated bridge-wall through the lowered throat and against the iron in the intervening melting-chamber, and a blast apparatus connected to said air-pipes.

In testimony whereof I affix my signature in presence of two witnesses.

BURT H. WHITELEY.

Witnesses:
ED. J. WALLACE,
H. P. FOLKERTH.